R. W. DULL.
DISTRIBUTER FOR SCREENING APPARATUS.
APPLICATION FILED OCT. 6, 1909.
1,037,221. Patented Sept. 3, 1912.
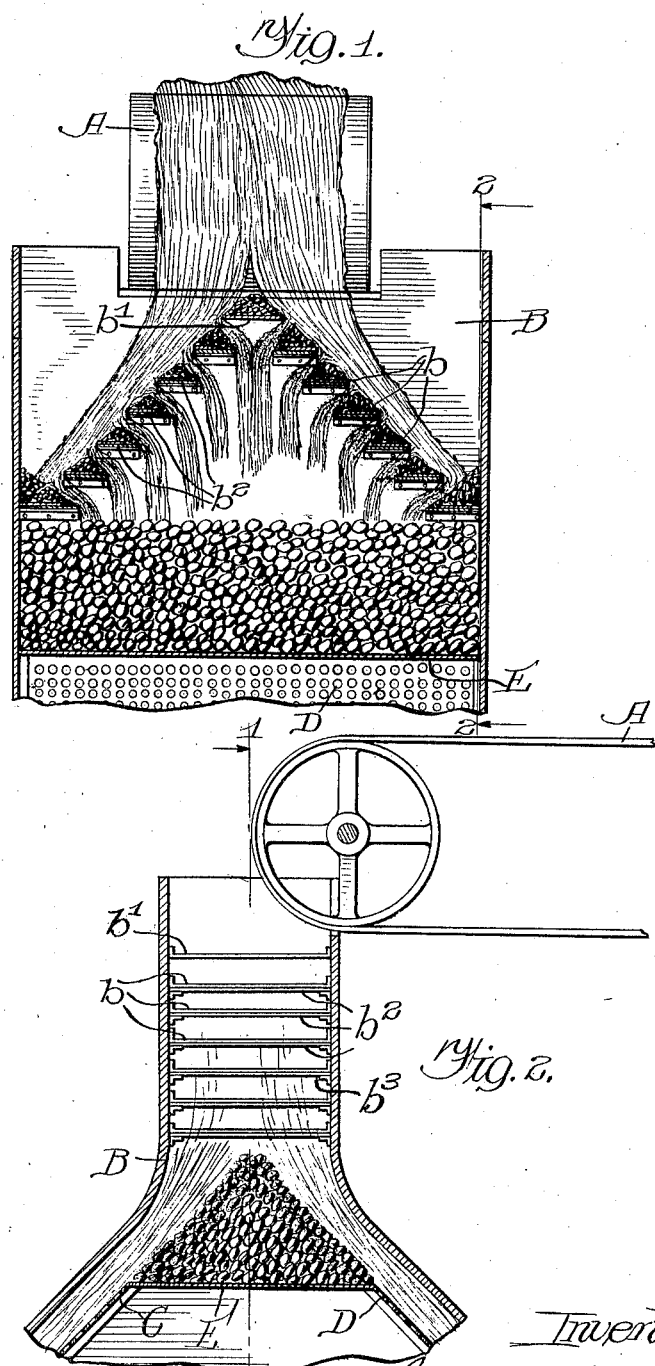

UNITED STATES PATENT OFFICE.

RAYMOND W. DULL, OF AURORA, ILLINOIS.

DISTRIBUTER FOR SCREENING APPARATUS.

1,037,221.  Specification of Letters Patent.  Patented Sept. 3, 1912.

Application filed October 6, 1909. Serial No. 521,248.

*To all whom it may concern:*

Be it known that I, RAYMOND W. DULL, a citizen of the United States of America, and resident of Aurora, Kane county, Illinois, have invented a certain new and useful Improvement in Distributers for Screening Apparatus, of which the following is a specification.

My invention contemplates a simple and highly efficient apparatus for distributing materials on screens.

In the handling of crushed stone, for example, the stone is delivered by a conveyer or elevator at a certain place, and is thereby concentrated at one point. This interferes with the screening operation, and tends to limit the size of the screens.

My invention contemplates an apparatus for spreading the crushed stone over a wide area, the distributers being even, or substantially so, thus insuring a better screening action, and making possible the use of larger screens.

It also contemplates a distributing apparatus for this purpose having means for regulating the flow therein to control the action thereof.

In the accompanying drawings, Figure 1 is a vertical section, on line 1—1 in Fig. 2, of a distributing apparatus embodying the principles of my invention. Fig. 2 is a vertical section on line 2—2 in Fig. 1.

As thus illustrated, the crushed stone or other material is delivered by a belt or conveyer A of any suitable character. The said stone is received in a hopper B the bottom of which is formed by a series of plates $b$ arranged in stepped relation to each other. These plates thus form two sets of steps, the two sets coming together at their tops and leading downward in opposite directions. These plates are supported only at their ends, and thus provide openings or passages between them. There is an opening between each step and the one above or below it. The top step or plate $b^1$ is broader than the others. An adjustable plate $b^2$ is mounted below and against the under side of each plate $b$. These plates $b^2$ are movable or adjustable to practically vary the area of the upper surfaces of the plates $b$. Any suitable means can be used for supporting the plates $b^2$ for this purpose. For example, they can, as shown, be mounted in any suitable manner to slide out and in to increase or diminish the width of the shelves, the ends of the plates being supported in guides $b^3$.

The screens C and D are arranged below the said distributing plates $b$, and at right angles thereto. These screens come close together at their upper edges, and slope downward in opposite directions. A horizontal plate E is interposed between the upper edges of these screens.

In operation, the crushed stone falls from the conveyer A upon the plates $b$, $b^1$ and $b^2$, forming a prism-shaped accumulation on each plate. When these accumulations have been formed, then the stone which falls thereon flows down at each side of said plates. Part of the stone flows down the outside of each prism of stone, and the other portion flows down the inside thereof. Thus before reaching the screens all of the stone passes between the plates $b$, falling from the inner edge of each plate in a thin sheet or stream. The aggregate of these streams reaches entirely across the screens, so that the sheet of stone flowing over each screen is evenly distributed over the entire area thereof. The stone will also form in prism shape on the plate E, and then the stone that follows will roll off onto the screens. These prisms of stone protect the iron plates $b$, $b^1$ and $b^2$ and E against wear. The impact and friction is all on the prisms of stone, and not on the said plates. The size of the openings between the prisms is varied by changing the size of the prisms. This is done by adjusting the plates $b^2$ below the plates $b$ to vary the area of the latter.

Thus it will be seen that by my invention I provide efficient means for distributing the stone or other materials over the surface of the screens. The arrangement can be such that all of the stone or other material will be deflected in one direction by a single screen, as, for example, by the screen C. Any suitable arrangement of one or more screens can be employed without departing from my invention.

The openings between the plates are of equal size or capacity, or substantially so, in order that the streams of falling material may be of the same size or volume, or substantially so, thus insuring even distribution in all directions over the surface of the screens.

The screening apparatus is stationary, and involves inclined screens, as previously explained, whereby the evenly distributed material is screened by a sliding or gravity action on the screens. The distributing mechanism is also stationary, and between this mechanism and the screens there is a support to which the distributed material is fed. This support forms an accumulation of material thereon, and the subsequently falling and evenly distributed material is deflected by this accumulation and caused to slide downward upon the screens. Thus the impact of the falling material is not sustained by the screens, but is taken up or absorbed by the accumulation of the material by the support on the upper end of the two screens. There is no agitation, and gravity takes care of the feeding and screening action to which the material is subjected from the time it is delivered to the distributing mechanism until it is discharged from the screening apparatus. With further respect to the regulation of the flow, by means of the adjustable plates $b^2$, it will be seen that this is of considerable importance, for this reason: That in order to obtain a uniform distribution of the material over the entire surface or area of the screen, it is essential that the flow be regulated in such manner that the stream of material descending from one shelf or plate to another will be sufficient in quantity to reach the lowermost shelf or plate. It must not go beyond this point—that is to say, it must not be sufficient in quantity to accumulate at the lowermost shelf or step of the series, or otherwise there will be danger of clogging and improper distribution. The shelves or steps produce deflections from the main stream of material, which deflections are of equal volume, and the regulation of the flow must be such that the last deflection is in reality all that is left of the main stream. With this method of distributing the materials over a stationary screen, it is not only unnecessary to fill the closure or housing in which the two series of shelves or steps are located, but it is important that this be avoided, as in such case there would be a large volume of stationary material which might cause clogging and stop the operation of the distributer entirely. If the material being fed by the belt or other device is coming slowly, then the openings between the shelves or steps must be correspondingly reduced in size, in order to insure having some of the material reach the lowermost step or shelf at each side. On the other hand, if the material is coming faster, then the flow regulating mechanism, consisting of the plates $b^2$, must be adjusted to provide somewhat larger openings for the deflections from the two main streams of descending material, as otherwise there would be an overflow of material at the lower end of each series of shelves or steps, resulting in an accumulation which in time would grow to such proportions that it might entirely fill the closure or housing in which the distributer is contained. With this arrangement it will be seen that each screen is desirably inclined about a horizontal axis which is at right-angles to the horizontal axis of inclination of the stepped series of plates. Also, means are provided for damming the lower end of each stream, in the manner shown, or in any suitable way, to prevent the stream from escaping anywhere except through the openings formed by the inner edges of the plates. This, I find, gives good results.

What I claim as my invention is:

1. A stationary screen and means for distributing material thereon, comprising a series of plates arranged in stepped relation to each other, to provide a series of distributing openings between them, with a clear space below, which openings are of the same, or substantially the same, size or capacity, and a stationary or motionless support for said plate, said openings being disposed at different heights, each plate adapted to hold an accumulation of the material, to prevent wearing away of the plates, said plates being so disposed relative to each other that said openings are not closed by accumulation of material thereon.

2. A stationary screen and means for distributing material thereon, comprising two series of plates, each series sloping downward away from the other, the plates being arranged in stepped relation to each other, thus providing two upwardly converging series of distributing openings between them, with a clear space below, which openings are of the same, or substantially the same, size or capacity, said openings being disposed at different heights, each plate adapted to hold an accumulation of the material, to prevent wearing away of the plates, said plates being so disposed relative to each other that said openings are not closed by accumulation of material thereon.

3. A stationary screen and means for distributing material thereon, comprising a series of shelves arranged in stepped relation to each other, to provide a series of distributing openings between them, each shelf being stationary and adapted to hold a quantity of the material thereon, and means for varying the supporting area of said shelves, to change the size of said openings, by varying the height of the material on the shelves, each shelf having an inner discharge edge and an outer edge for feeding the material to the next lower shelf.

4. A stationary screen and a distributer therefor, comprising a series of stepped plates of equal size for distributing material evenly across the top of said screen, by forming streams of material, which streams are deflections of equal volume from the same constantly decreasing main stream flowing from plate to plate, and means for regulating the flow by changing the size of said streams, whereby the last deflection is always the final portion of the main stream.

5. A stationary screen and a distributer therefor, comprising stationary means for forming a main flow of material by gravity, to produce an inclined stream, having provisions for producing separate deflections of equal volume from the bottom of the main flow, at regular intervals along the length thereof, disposed in position to deliver said deflections at regular intervals along a given area, and means for regulating the flow, by adjusting said provisions to vary the size of said deflections, whereby the last deflection is always the final portion of the main flow.

6. A stationary screen and a distributer therefor, comprising a series of stepped plates for distributing material evenly across the top of said screen, by forming streams of material, which streams are transverse deflections of equal volume from the bottom of the same constantly decreasing main stream flowing from plate to plate, said deflections occurring at intervals in the direction of flow of the main stream, and means for feeding the material to the said stepped plates, the number and size and relation of said plates being such that the last deflection, with a given rate of feed, is the final portion of the main stream.

7. A stationary screen and a distributer therefor, comprising stationary means for forming a main flow of material by gravity, having provisions for producing separate deflections of equal volume from the main flow, at regular intervals along the length thereof, disposed in position to deliver said deflections at regular intervals along the surface of a given area, and means for feeding the material to said stationary means, the said stationary means being so adjusted that, with a given rate of feed, the last deflection is the final portion of the main flow.

8. In a screening apparatus, the combination of a stationary screen, and a stationary distributer for delivering the material thereto, and for evenly spreading the same thereon, and means operative without changing the position of the distributer as a whole for adjusting the parts of the distributer relative to each other to keep the screening action coextensive with the area of the screen.

9. In a screening apparatus, the combination of a stationary screen, a stationary distributer for delivering the material thereto, and for evenly spreading the same thereon, a feeder for delivering the material to the distributer, the feeder being of less area than the screen, and means operative without changing the position of the distributer as a whole for adjusting the parts of the distributer relative to each other to keep the screening action coextensive with the area of the screen.

10. A stationary screen and a delivering and distributing apparatus therefor, comprising a stationary distributer, and means on the distributer for controlling the flow and regulating the distribution of the material, said means comprising plates having stationary edges for feeding the material from one plate to another, and movable edges for feeding deflected portions of said material on to the screen.

11. A stationary screen and a delivering and distributing apparatus therefor, comprising a stationary distributer having a series of feed openings, a feeder for delivering the material to the distributer, and means on the distributer for controlling the flow and regulating the distribution of the material, said means comprising mechanism for changing the size of each one of the series of feed openings which are successively encountered by the material falling from said feeder.

12. A stationary screen and a distributer therefor, comprising a series of steps for forming a main inclined stream of certain volume, and for successively deflecting portions of said stream downwardly therefrom, which deflections may be of equal volume, each step having a fixed portion for delivering to the next step, and each step having an adjustable portion for discharging the deflection.

13. A stationary screen and a distributer therefor, comprising a series of steps for forming a main inclined stream of certain volume, and for successively deflecting portions of said stream downwardly therefrom, which deflections may be of equal volume, and means for regulating the flow of said deflections without changing the angle of the said stream.

14. A stationary screen and a distributer therefor, comprising an inclined series of steps forming distributing openings between them, means for feeding a stream of material down the inclined series of steps, to form deflections which fall inward from said openings directly onto said screen, and means for damming the lower end of the said stream, to compel the final portion of said stream to fall inward.

15. A stationary screen and a distributer therefor, comprising an inclined series of steps forming distributing openings between them, means for feeding a stream of material down the inclined series of steps, means for damming the lower end of the said stream, and means for adjusting the distributer to change the size of said openings.

16. A stationary screen and a distributer therefor, comprising an inclined series of steps forming distributing openings between them, means for feeding a stream of material down the inclined series of steps, means for damming the lower end of the said stream, and means in the distributer for adjusting each opening independently of the others.

17. The combination of a stationary screen, an inclined series of stepped plates above said screen, said plates being spaced apart to provide a series of distributing openings between them, and means for maintaining a downwardly flowing stream of material over said plates, said openings being of the same size and thereby producing deflections of equal volume from the said stream, and said screen receiving said deflections directly and at different points over the surface thereof.

18. The combination of a stationary screen, an inclined series of stepped plates above said screen, said plates providing a series of distributing openings between them, means for maintaining a downwardly flowing stream of material over said plates, and means for adjusting the said openings in accordance with the size or character of the said stream.

19. The combination of a stationary screen, an inclined series of stepped plates above said screen, said plates providing a series of distributing openings between them, and means for maintaining a downwardly flowing stream of material over said plates, said screen being inclined about a horizontal axis extending at right-angles to the horizontal axis of inclination of said series of plates.

20. The combination of a stationary screen, an inclined series of stepped plates above said screen, said plates providing a series of distributing openings between them, and means for maintaining a downwardly flowing stream of material over said plates, said openings producing deflections of equal volume from the said stream, and said screen receiving said deflections directly and at different points over the surface thereof, said screen being inclined about an axis at right angles to the axis of inclination of said series of plates.

21. The combination of a stationary screen, an inclined series of stepped plates above said screen, said plates providing a series of distributed openings between them, means for maintaining a downwardly flowing stream of material over said plates, and means for adjusting the said openings in accordance with the size or character of the said stream, said screen being inclined about an axis at right angles to the axis of inclination of said series of plates.

Signed by me at Chicago, Illinois, this 21st day of September, 1909.

RAYMOND W. DULL.

Witnesses:
Wm. B. Duimon,
E. H. Clegg.

---

Copies of this patent may be obtained for five cents each, by addressing the "Commissioner of Patents. Washington, D. C."